A. J. EWALD.
LOAD BRAKE APPARATUS.
APPLICATION FILED DEC. 27, 1912.
1,107,505.
Patented Aug. 18, 1914.
3 SHEETS—SHEET 2.
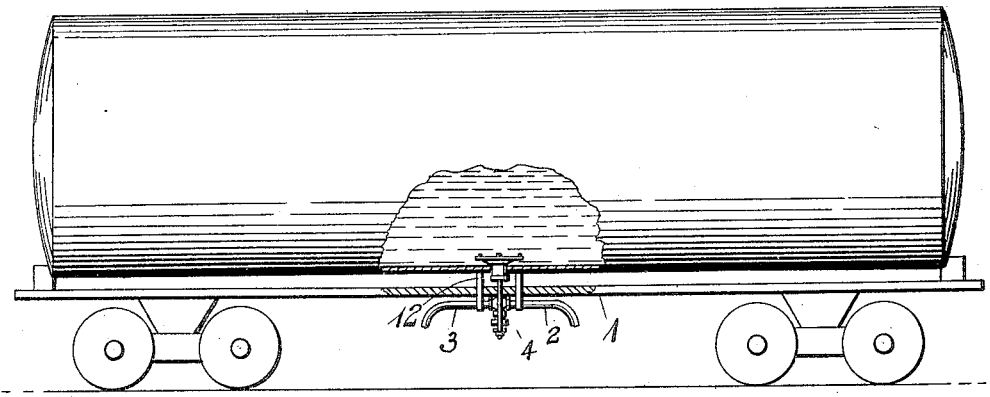
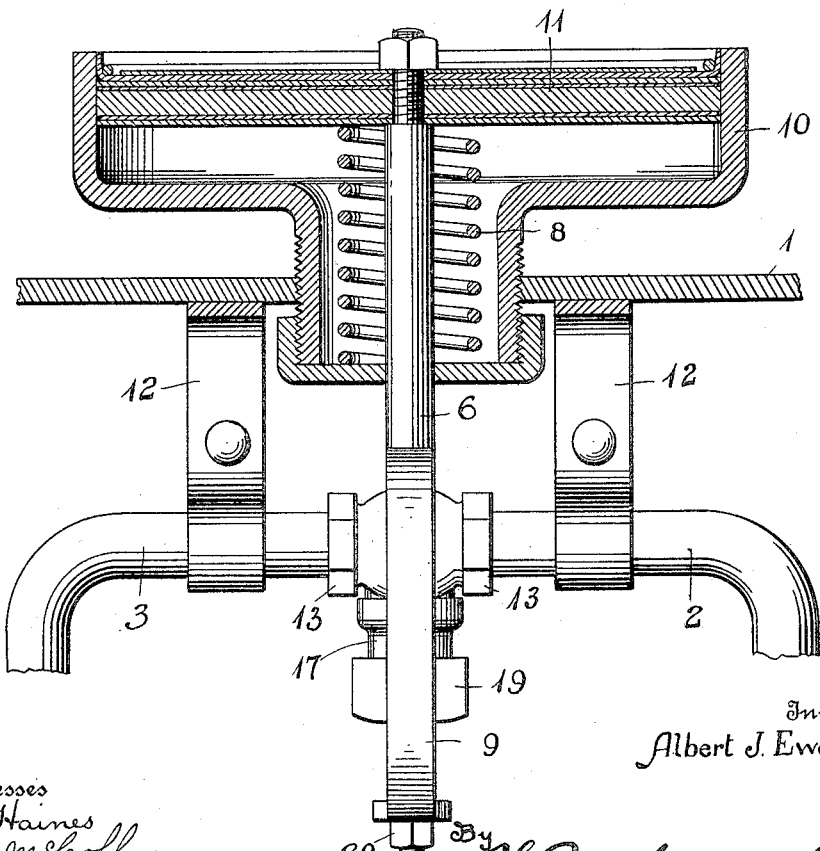
Witnesses
E. D. Haines
S. M. McColl
Inventor
Albert J. Ewald
By H. B. Willeson &Co
Attorney

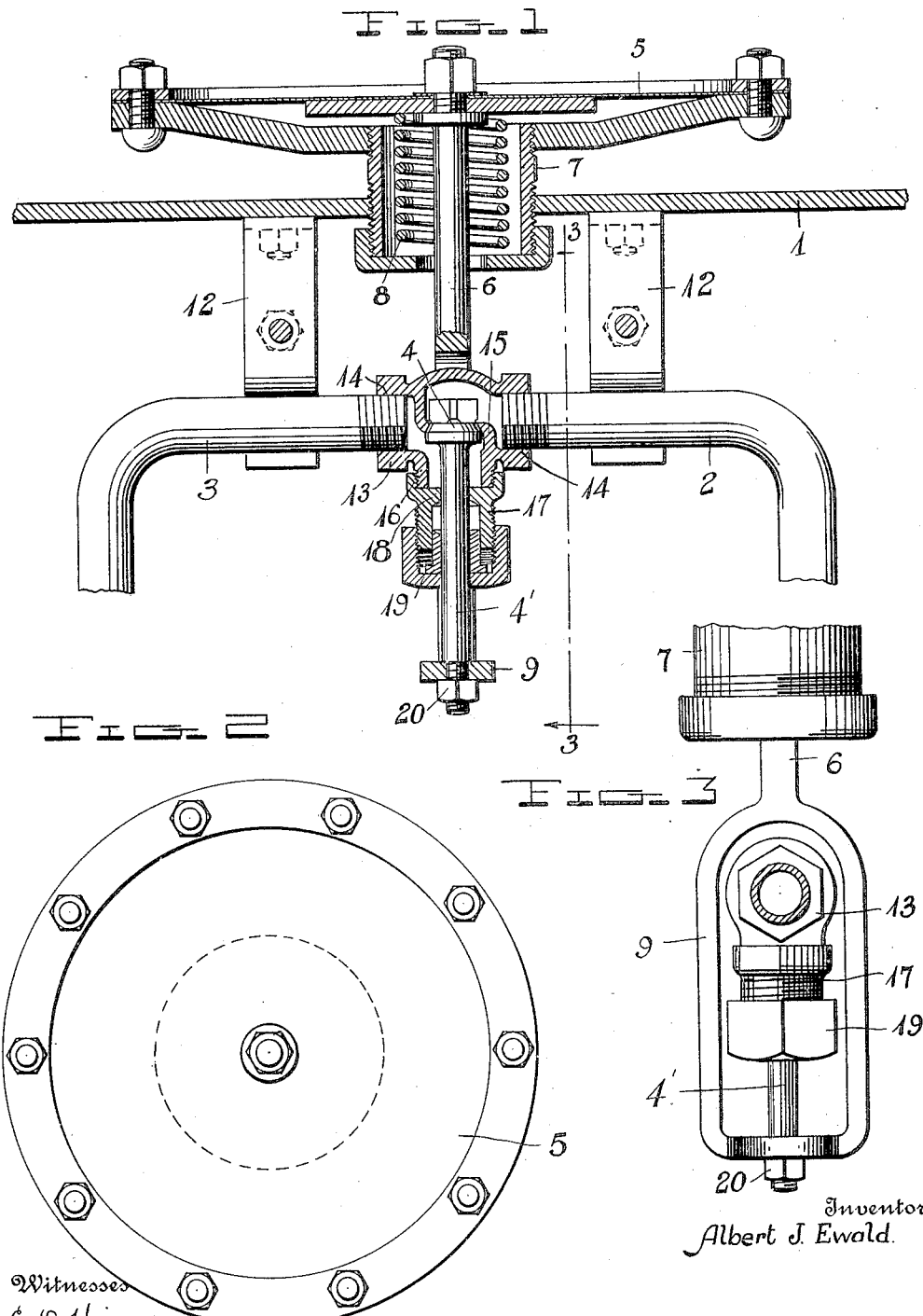

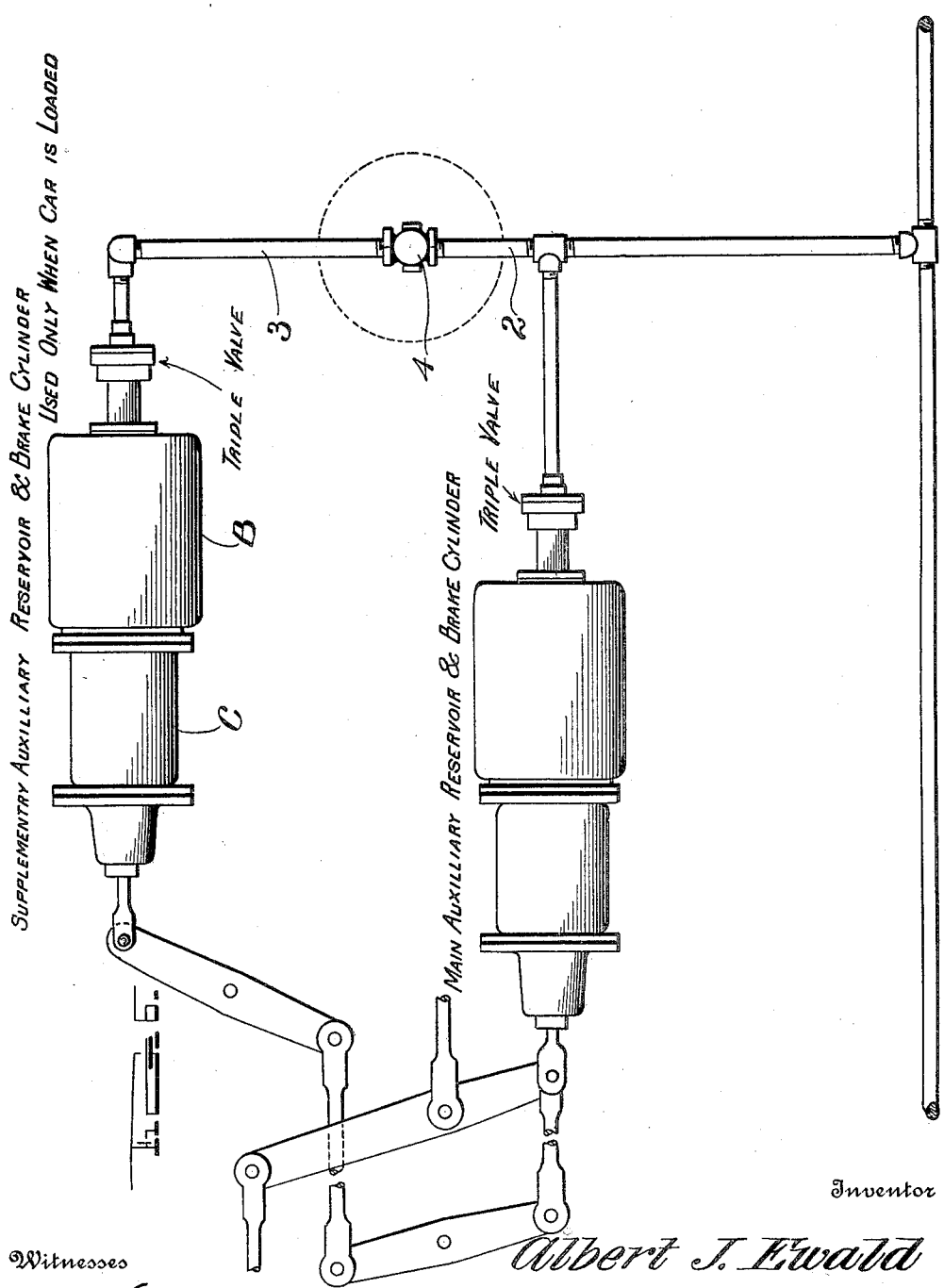

UNITED STATES PATENT OFFICE.

ALBERT J. EWALD, OF LOS ANGELES, CALIFORNIA.

LOAD BRAKE APPARATUS.

1,107,505. Specification of Letters Patent. Patented Aug. 18, 1914.

Application filed December 27, 1912. Serial No. 738,944.

*To all whom it may concern:*

Be it known that I, ALBERT J. EWALD, a citizen of the United States, residing at Los Angeles, in the county of Los Angeles and State of California, have invented certain new and useful Improvements in Load Brake Apparatus; and I do declare the following to be a full, clear, and exact description of the invention, such as will enable others skilled in the art to which it appertains to make and use the same.

This invention relates to fluid pressure brakes and more particularly to what is known as load brake apparatus by means of which the braking power may be automatically adjusted, according to the weight of the load whereby the braking power is limited to a safe degree upon empty cars but is greatly increased upon loaded cars.

The main object of the invention is to provide simple and efficient means actuated by the weight or pressure of the material itself with which the car is loaded for adjusting a load regulated device to give heavy braking power when the car is loaded and light braking power when the car is empty.

With these and other objects in view, the invention consists of certain novel features of construction, combination and arrangement of parts as will be more fully described and claimed.

In the accompanying drawings Figure 1 represents a vertical sectional view of one form of this improved device. Fig. 2 is a top plan view thereof. Fig. 3 is a transverse section taken on the line 3—3 of Fig. 1. Fig. 4 is a side elevation with parts broken out of an oil car equipped with this invention. Fig. 5 is a longitudinal vertical section showing a slightly different form of the invention. Fig. 6 shows diagrammatically the light and load brake mechanism employed in connection with this invention.

In the embodiment illustrated, the invention is shown applied to a liquid transporting car such as an oil car 1, equipped with the standard air brake apparatus and with which a pipe 2 is connected. A pipe 3 is connected with the train line and a valve 4 is arranged between pipes 2 and 3 and controlled by the pressure of the load in car 1, as will be hereinafter described.

In the form of the invention shown in Fig. 1, a suitable diaphragm 5 is arranged within the tank or car 1 and has a stem 6 connected with its lower face and passing through the bottom of the car. A suitable housing 7 surrounds the stem 6 and a coil spring 8 is mounted within said housing around said stem and exerts its pressure to force the diaphragm 5 upward against the pressure of the material in the car, said spring being regulated to exert a predetermined pressure on said diaphragm. This stem 6 is connected with the valve 4 by means of a yoke 9 connected with the stem 4' of said valve as is shown clearly in Figs. 1 and 3. When the car is empty the spring 8 forces the diaphragm 5 upward and closes the valve 4, cutting off communication between the pipes 2 and 3. When the car or tank 1 is filled with liquid or other material, the weight of the contents of the car resting on the diaphragm 5 overcomes the tension of the spring 8 and forces said diaphragm downwardly together with the stems 6 and 4', whereby the valve 4 is opened and communication between the train pipe 3 and the pipe 2 is established, said pipe 2 leading to an auxiliary reservoir and brake cylinder, B, C, which are designed to be used only when the car is loaded and which exert the required braking force necessary for use in connection with a loaded car. When the contents of the car 1 are removed the spring 8 forces the diaphragm 5 upwardly into the position shown in Fig. 1 and closes the valve 4, thereby cutting off communication between the train line and the auxiliary reservoir and brake cylinder above referred to, thus rendering said auxiliary reservoir inoperative until the car is again filled.

In the form shown in Fig. 5, a cylinder 10 is employed having a piston 11 operating therein and connected with the stem or piston rod 6 and by means of which the valve 4 is controlled, the operation of the device being exactly the same as that above described. The pipes 2 and 3 are shown supported in suitable hangers 12 depending from the bottom of the car, but it is obvious that they may be supported in any other suitable or desired manner. The casing 13 of the valve 4 is here shown in the form of a casting having internally-threaded nipples or coupling members 14 for the reception of the pipes 2 and 3 and between which is arranged a partition 15 having a valve seat 16 with which the valve 4 coöperates. This casing 13 also has an externally-threaded nipple 16 with which a sleeve 17 is detachably engaged to afford access to the valve 4 when desired. This sleeve 17 has an apertured transverse partition 18 through which the valve stem 4' passes, the end of said sleeve being closed by a suitable cap or stuffing box 19. The stem 4' of the valve 4 extends through a screw-threaded aperture in the bottom cross bar of the yoke 9 and is connected therewith by a nut 20 or other suitable means.

While I have described my invention with more or less minuteness as regards details and as being embodied in certain precise forms, I do not desire to be limited thereto unduly any more than is pointed out in the claims. On the contrary, I contemplate all proper changes in form, construction and arrangement, the omission of immaterial elements and substitution of equivalents as circumstances may suggest or render expedient.

I claim as my invention:—

1. In a load brake apparatus, the combination with a train pipe, a pipe adapted to lead to an auxiliary reservoir, a valve between said pipes, a load depressing element adapted to be disposed within a car, a stem secured to said element and adapted to extend through the bottom of the car, yieldable means for holding said element normally in raised position, a yoke secured to said stem, and a stem on said valve connected with said yoke.

2. In a load brake apparatus, the combination with a train pipe, a pipe adapted to lead to an auxiliary reservoir, a suitably supported valve casing connecting said pipes, a partition in said casing separating said pipes and having an opening therein, an upwardly closing valve for said opening, a stem on said valve extending through said casing, a load depressible element, a stem secured to said element, a yoke connecting said stem with said valve stem, and means for returning said element to normal position when the load is lightened.

3. In a load brake apparatus the combination with a train pipe, a pipe adapted to lead to an auxiliary reservoir, a valve between said pipes, a load controlled element adapted to be disposed within a car, a stem secured to said element and adapted to extend through the bottom of the car, means for holding said element normally in raised position, and a stem on said valve connected with the stem of said element.

In testimony whereof I have hereunto set my hand in presence of two subscribing witnesses.

ALBERT J. EWALD.

Witnesses:
 ARTHUR C. WHATLEY,
 JOHN A. BARRY.

---

Copies of this patent may be obtained for five cents each, by addressing the "Commissioner of Patents, Washington, D. C."